United States Patent [19]
Shultz

[11] Patent Number: 4,552,667
[45] Date of Patent: Nov. 12, 1985

[54] DESTRUCTION OF ORGANIC HAZARDOUS WASTES

[76] Inventor: Clifford G. Shultz, 1701 Glendale, Evansville, Ind. 47712

[21] Appl. No.: 624,368

[22] Filed: Jun. 25, 1984

[51] Int. Cl.$^4$ .................... C02F 1/70; B01D 47/02
[52] U.S. Cl. .................... 210/757; 210/774; 210/761; 210/909; 423/DIG. 12; 423/210.5; 159/47.3; 75/65 R
[58] Field of Search ............ 210/909, 757, 719, 774, 210/770, 751, 180, 761; 159/47.3; 75/65 R, 68 C; 423/DIG. 12, 659, 210.5; 134/2, 42

[56] References Cited

U.S. PATENT DOCUMENTS

| | | | |
|---|---|---|---|
| 3,343,911 | 9/1967 | Eisenlohr | 423/495 |
| 3,642,583 | 2/1972 | Greenberg et al. | 423/DIG. 12 |
| 4,246,255 | 4/1979 | Grantham | 423/210.5 X |
| 4,447,262 | 5/1984 | Gay et al. | 210/909 |
| 4,469,661 | 9/1984 | Shultz | 423/210.5 |

FOREIGN PATENT DOCUMENTS

| | | | |
|---|---|---|---|
| 61411 | 9/1982 | European Pat. Off. | 75/68 C |
| 52-57149 | 5/1977 | Japan | 423/DIG. 12 |

Primary Examiner—Benoit Castel

[57] ABSTRACT

Hazardous waste containing organic compound having covalently bound oxygen, nitrogen, sulfur and/or phosphorus is reduced with aluminum to less hazardous form.

14 Claims, 1 Drawing Figure

DESTRUCTION OF ORGANIC HAZARDOUS WASTES

TECHNICAL FIELD

This invention is directed to destroying hazardous wastes containing organic compounds which contain covalently bound oxygen, nitrogen, sulfur, and/or phosphorus.

BACKGROUND OF THE INVENTION

Many hazardous wastes have been disposed of improperly during the years since the chemical age began. Some of these resulted from incomplete reactions at chemical manufacturing plants; others were isomeric or side-reaction products which were not suitable for use. Still others are compounds which had been manufactured and in use, but had been discovered to present a real or potential hazard to workers in the plants manufacturing them, to their users, or to people exposed to them. Little notice was paid these discarded materials until recently, when the magnitude of their quantity has made it a problem which can no longer be ignored. Many were buried in improperly secured landfills; some in open dumps; some simply left standing in drums; some dumped on the ground.

Some companies early in the "waste mangement" business charged generators for disposing of their wastes, and merely stockpiled them, without making any attempt to effect a proper, environmentally safe treatment or disposal. Thousands of these dumps are known to exist, and much attention is being given to methods of containment or disposal of their contents. More recently, much effort has gone into devising processes for their destruction or disposal.

Methods for their disposal include: secured landfills; incineration in lime or cement kilns; incineration in specially constructed incinerators designed to retain the combustion gases for long periods of time in order to insure complete oxidation; oxidation in molten salt baths which utilize the molten salt to retain the combustion products and maintain the high temperature necessary. Recently adopted processes involve reaction of polychlorinated biphenyls (PCB's) with a sodium alkyl, a process which has been in use for a long time as an analytical tool. This is a reductive process in which the sodium in the sodium alkyl abstracts the chlorine from the PCB molecule. This can result in addition of the alkyl to the biphenyl ring structure, or it may be done in a medium which can supply substituents to the fragments.

Sodium metal has also been applied to the analytical determination of organically bound halogens; reducing the covalently bound halogen and forming the negative halide ion.

SUMMARY OF THE INVENTION

The present invention utilizes molten metallic aluminum or powdered aluminum and heating to react with the covalently bound oxygen, nitrogen, sulfur, and phosphorus in hazardous organic compounds containing these to reduce the compounds, for example, to form ionic inorganic salts or oxides, causing the organic residues to become dehydrated, combined, or rearranged into innocuous gaseous compounds.

DESCRIPTION OF THE DRAWING

A preferred process for carrying out the invention is schematically illustrated in the sole figure of the drawings which is denoted FIG. 1 herein.

DETAILED DESCRIPTION

Figure 1:
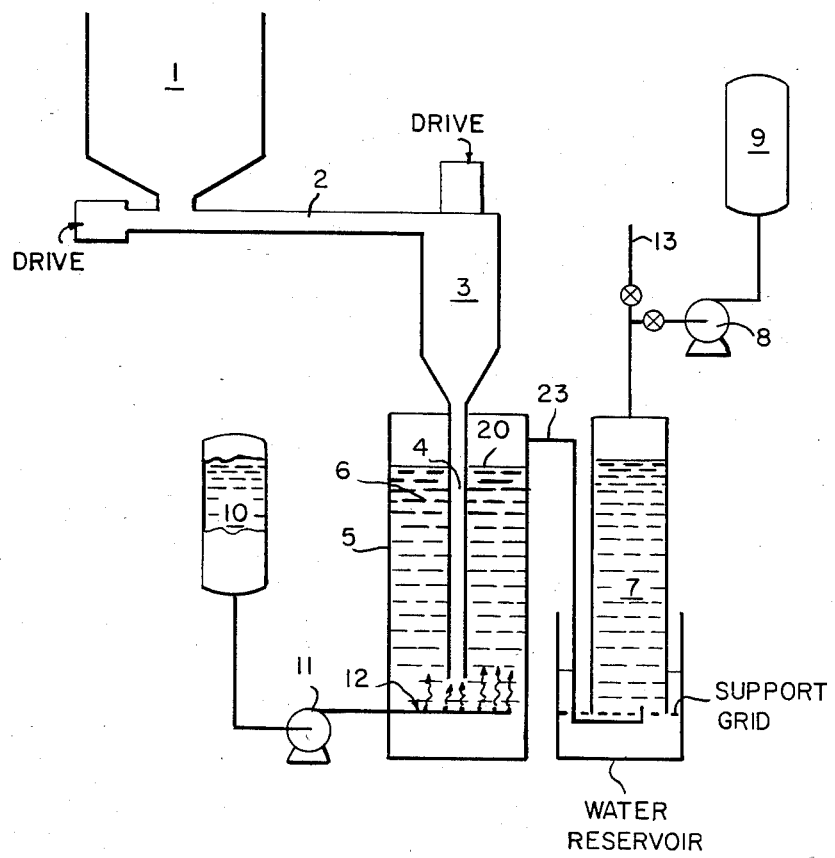

Hazardous compounds containing covalently bound oxygen which are treatable in the process herein include, for example, alcohols, aldehydes, ketones, carboxylic acids, esters and ethers. By such treatment, the compounds are reduced to unsaturated hydrocarbons, hydrogen and carbon; the aluminum becomes oxidized to aluminum oxide. Such compounds include:

3-(alpha-Acetonylbenzyl)-4-hydroxycoumarin and salts
Acrolein
Allyl alcohol
Bis(chloromethyl) ether
Bromoacetone
2-Butanone peroxide
Chloroacetaldehyde
Endrin
Fluoroacetic acid, sodium salt
1,2,3,4,10,10-Hexachloro-1,4,4a,5,8,8a-hexahydro-1,4,5,8-endo, endo-dimethanonaphthalene
Dimethoate
Methomyl
Oleyl alcohol condensed with 2 moles ethylene oxide
7-Oxabicyclo (2,2,1)heptane-2,3-dicarboxylic acid
Pentachlorophenol
Phenylmercury acetate
Phosgene
1,2-Propanediol
2 Propyn-1-01
Acetone
Acetyl chloride
Acrylic acid
Bis (2-chlorethoxy) methane
Acetone
Bis (2-chloroethyl) ether
Bis (2-chloroisopropyl) ether
Bis (2-ethylhexyl) phthalate
4-Bromophenyl phenyl ether
n-Butyl alcohol
Carbonyl fluoride
Chloral
Chlordane
Chlorobenzilate
p-Chloro-m-cresol
1-Chloro-2,3-epoxypropane
Chlorethyl vinyl ether
Cresols
Crotonaldehyde
Cresylic acid
Cyclohexanone
Di-n-butyl phthalate
2,4-Dichlorophenol
2,6-Dichlorophenol
Diepoxybutane
Diethyl phthalate
Diethylstilbestrol
Dihydrosafrole
Alpha,alpha-dimethylbenzylhydroperoxide
2,4-Dimethylphenol
Dimethyl phthalate
Di-n-octyl phthalate
1,4-Dioxane
Ethyl acetate Ethyl acrylate
Ethylene oxide
Ethyl ether
Ethylmethacrylate
Formaldehyde
Formic acid
Furan
Furfural
Glycidylaldehyde
Hexachlorophene
Hydroxydimethyl arsine oxide
Iron Dextran
Isobutyl alcohol
Isosafrole
Kepone
Maleic anhydride
Methanol
Methyl chlorocarbonate
Methyl ethyl ketone
Methyl ethyl ketone peroxide
Methyl isobutyl ketone
Methyl methacrylate
1,4-Naphthoquinone
Oxalic acid
Paraldehyde
Phenol
Phthalic anhydride
Quinones
Resorcinol
Safrole
2,3,4,6-Tetrachlorophenol
Tetrahydrofuran
Toxaphene 2,4,5-TP
2,4,5-Trichlorophenol
2,4,6-Trichlorophenol
2,4,5-Trichlorophenoxyacetic acid
2,4,5-Trichlorophenoxy propionic acid Hazardous compounds containing covalently bound nitrogen which are treatable by the process herein include, for example, amines and nitriles (cyanides). In the treatment herein, these are reduced to hydrocarbons, hydrogen, nitrogen and carbon, while the aluminum is converted to the nitride. Such compounds include:
4-Aminopyridine
p-Chloroaniline
3-Chloropropionitrile
Cyanogen
Cyanogen bromide
Cyanogen chloride
Alpha, alpha-dimethylphenethylamine
Ethylcyanide
Ethylenediamine
Ethyleneimine
Hydrocyanic acid
2-Methylaziridine
Methyl hydrazine
2-Methyllactonitrile
Nicotine and salts
Propionitrile
Acetonitrile
Acetylaminofluorene
Acrylonitrile
Amitrole
Aniline
Auramine
Benz(c)acridine
N,N-Bis (2-chloroethyl)-2-naphthylamine
3,3-Dichlorobenzidine
1,2-Diethylhydrazine
Dimethylamine
p-Dimethylaminoazobenzene
3,3-Dimethylbenzidine
1,2-Diethylhydrazine
Dipropylamine
Maleic hydrazide
Malononitrile
Melphalan
Methacrylonitrile
4,4-Methylene-bis-(2-chloroaniline)
1,4-Naphthylamine
2-Naphthylamine
2-Picoline
n-Propylamine
Pyridine
Toluenediamine
Toluidine hydrochloride Hazardous organic compounds containing covalently bound sulfur which are treatable by the process herein include sulfides, thiols, thiocarbonyls, thioketones and mercaptans. In the treatment herein, these are reduced to hydrocarbons, carbon and hydrogen while the aluminum is oxidized to the sulfide. These compounds include:
Thiocarbonyl chloride
Carbon disulfide
Thioacetone trimer
Methyl mercaptan
Endosulfan
Trichloromethanethiol
Hydrogen sulfide Hazardous organic wastes containing covalently bound phosphorous which are treatable by the process herein include, for example, phosphines, e.g. methyl phosphine. Treatment herein results in formation of hydrocarbons, hydrogen and carbon while aluminum phosphide is formed.

The hazardous organic compounds containing both covalently bound oxygen and covalently bound nitrogen which are treatable by the process herein include, for example, nitro and nitroso compounds, amides, oximes, amino alcohols, and amino acids. By the treatment herein such compounds are reduced to hydrocarbons, hydrogen, nitrogen and carbon, while the aluminum is converted to oxide and nitride. Such compounds include:
5-(Aminomethyl)-3-isoxazolol
Ammonium picrate
Brucine
2-Sec-Butyl-4,6-dinitrophenol
1-(p-Chlorobenzoyl)-5-methoxy-methylindole-3-acetic acid
Dieldrin
4,6-Dinitro-o-cresol and salts
2,4-Dinitrophenol
2-Fluoroacetamide
Isocyanic acid, methyl ester
2-Methyl-2-(methylthio)propionaldehyde-o-(methylcarbonyl) oxime
N-Methyl-N-nitro-N-nitrosoguanidine
p-Nitroaniline
Nitrobenzene
Nitroglycerine
N-Nitrosodimethylamine
N-Nitrosodiphenylamine
N-Nitrosomethylvinylamine  6-Amino-1,1a,2,8,8a,8b-hexahydro-8-(hydroxymethyl)8-methoxy-5-methylcarbamate azirino (2',3',3,4) pyrrolo(1,2-a) indole-4,7-dione (ester)
Azaserine
Chlorambucil
Daunomycin
3,3-Dimethylbenzidine
Dimethylcarbamoyl chloride
Dimethylnitrosoamine
2,4-Dinitrotoluene
2,6-Dinitrotoluene
Di-n-propylnitrosamine
Maleic hydrazide
4-Nitrophenol
2-Nitropropane
N-Nitrosodi-n-butylamine
N-Nitrosodiethanolamine
N-Nitrosodiethylamine
N-Nitrosodi-n-propylamine
N-Nitroso-n-ethylurea
N-Nitroso-n-methylurea
N-Nitroso-n-methylurethane
N-Nitrosopiperidine
N-Nitrosopyrrolidine
5-Nitro-o-toluidine
Pentachloronitrobenzene
Phenacetin
Pronamide
Reserpine
Saccharin
Streptozotocin
Toluene diisocyanate
Trinitrobenzene
Uracil mustard
Urethane Hazardous organic compounds containing both covalently bound oxygen and covalently bound sulfur which are treatable by the process herein include, for example, sulfonic acids, sulfonates, thiols and sulfones. In the treatment herein, these are converted to hydrocarbons, carbon and hydrogen and the aluminum is oxidized to oxide and sulfide. Such compounds include:
Benzenethiol
Dimethyl sulfate
Dodecylbenzene sulfonic acid
Endosulfan
Ethyl methanesulfonate
1,3-Propane sulfone Hazardous organic compounds containing both covalently bound oxygen and covalently bound phosphorus which are treatable by the process herein include, for example, phosphates, and phosphonates. By the treatment by the process herein, these are reduced to hydrocarbons, carbon and hydrogen and the aluminum is oxidized to oxide and phosphide. Such compounds include:
Hexaethyl tetraphosphate
Methylene diphosphonate
Tetraethylpyrophosphate
Tris-(2,3-dibromopropyl) phosphate Hazardous organic wastes containing both covalently bound nitrogen and covalently bound sulfur which are treatable by the process herein include, for example, thioamides, and aminothiols. These react in the process herein to form hydrocarbons, hydrogen carbon and nitrogen while the aluminum forms nitride and sulfide. Compounds of this type are:
1-(o-Chlorophenyl)thiourea
2,4-Dithiobiuret
Ethylene bis dithiocarbamate
Ethylene thiourea
Methyl pyrilene
Methyl thiouracil
1-Naphthyl-2-thiourea
N-Phenylthiourea
Thioacetamide
Thiosemicarbazide
Thiourea
Thiuram
Trichloromethanethiol Hazardous organic wastes containing oxygen and nitrogen and sulfur; oxygen and phosphorus and sulfur; oxygen and nitrogen and phosphorus, those containing all four; including those which additionally contain halogen; react with molten aluminum to either carbonize or degrade the compound into simpler hydrocarbons or hydrogen and carbon. The aluminum reactant forms the appropriate salt or salts. Hazardous organic wastes having more than two of these elements as substituents are as follows:
1-Acetyl-2-thiourea
Diallate
Dimethoate
Ethylenebisdithiocarbamate
Methylthiouracil
Trypan blue
0,0-Diethyl-S-(2-(ethylthio)ethyl)ester of phosphorothioic acid
Phorate
Tetraethyldithiopyrophosphate
0,0-Diethyl-S-methyl ester of phosporodithioic acid
Octamethylpyrophosphoramide
3,3-Dimethyl-1-(methylthio)-2-butanone-0-(methylamino) carbonyl oxime
Methyl parathion
Parathion As indicated above the hazardous organic compounds treated herein sometimes additionally contain halogen, e.g. chlorine, bromine, iodine or fluorine.

The use of powdered aluminum coupled with heating or molten aluminum for hazardous waste destruction combines the strong reducing power of this active metal with the naturally destructive tendency of heat.

A presently preferred process for carrying out the invention is schematically illustrated in FIG. 1 and comprises the following steps:

Incoming solid hazardous wastes are placed in a receiving hopper 1, which is covered and sealed when not being loaded. The waste is then conveyed by a horizontal screw conveyor 2 to a feed hopper 3. A vertical screw conveyor 4 feeds the waste downward through an open tube which has its terminus near the bottom of a reactor 5 into the bath of molten aluminum 6 with the upper surface of bath being denoted by reference numeral 20. Vapors rising from the reaction zone pass into a water trap 7 via pipe 23 and then are compressed by compressor 8 and stored for fuel in pressure tank 9, or else are flared to the atmosphere through a fire screen 13. Liquid hazardous wastes are stored in a storage tank 10, and a pump 11 pumps them through the apertures in the inlet pipe 12 into the reactor 5. Liquids or vapors—either from vaporization of the liquids, or from reaction, rise through the aluminum 6 and react completely.

In a less preferred embodiment, hazardous waste is treated with powdered aluminum and heating. This is readily carried out in either a continuous or a batch process. Continuous processing can involve, for example, mixing and/or milling hazardous waste and powdered aluminum, and conveying the resulting admixture through a tube furnace. Batch processing can involve mixing hazardous waste and powdered aluminum, and heating the resulting admixture in a sealed chamber. Preferably, the heating is to provide a temperature of at least about 250° C.

In processing with molten aluminum, the temperature is at least 660° C. which is the melting point of aluminum. Temperatures up to the boiling point of aluminum of 2450° C. are readily used.

In the processing herein, as indicated above, hydrocarbons and hydrogen can be formed. The hydrocarbons can include combustible gases such as methane, propane, acetylene, and ethene. The hydrogen and gaseous hydrocarbons which are formed are readily utilized for combustion to provide heat energy e.g. to melt aluminum to provide the molten aluminum reactant or to provide the heating when processing with powdered aluminum.

Hazardous waste which is treated can contain one or a plurality of hazardous organic compounds The following specific examples illustrate the invention.

EXAMPLE I

Oxalic acid was immersed in molten aluminum. Hydrocarbon gas is generated and aluminum oxide forms on the molten metal surface.

EXAMPLE II n-Butyl alcohol was immersed in molten aluminum. A gas was generated which corresponded to a mixture of hydrogen and 1-butene. Aluminum oxide formed.

EXAMPLE III

Acetone is substituted for the butanol in Example II with the result that the acetone is destroyed and hydrocarbon gas and hydrogen are produced.

EXAMPLE IV

Formaldehyde is substituted for the butanol in Example II with the result that the formaldehyde is destroyed and hydrocarbon gas and hydrogen are produced.

EXAMPLE V

Ethyl ether is substituted for the butanol in Example II with the result that the ethyl ether is destroyed and hydrocarbon gas and hydrogen are produced.

EXAMPLE VI

Dimethyl phthalate is substituted for the butanol in Example II with the result that the dimethyl phthalate is destroyed and hydrocarbon gas and hydrogen are produced.

EXAMPLE VII

Acetonitrile was destroyed by immersion in molten aluminum. No cyanide or cyanogen was detected in either the evolved gas or in the cooled melt.

EXAMPLE VIII

Naphthylamine was immersed in molten aluminum and reacted with evolution of gas. Neither the gas nor the solid residue contained any traces of amine. Ammonia was found on treating the solidified metal with water. Carbon was also found in the metal.

EXAMPLE IX

Carbon disulfide decomposed rapidly upon treatment with molten aluminum, generating gaseous sulfur. The cooled melt contained both aluminum sulfide and sulfur.

EXAMPLE X

Methyl phosphine is immersed in molten aluminum and gaseous hydrocarbon and hydrogen evolves.

EXAMPLE XI

A mixed alkyl benzene sulfonate was destroyed by molten aluminum, generating a combustible gas and leaving aluminum sulfide and carbon in the metal.

EXAMPLE XII p-Nitrophenol was heated with powdered aluminum. The resulting reaction was exothermic reducing the nitro group to form a compound in the residue which hydrolyzes to ammonia. A gas tentatively identified as acetylene was given off during the reaction.

EXAMPLE XIII

A phosphate ester detergent is immersed in molten aluminum. The residue contains an inorganic phosphorus compound, carbon, and aluminum oxide.

When powdered aluminum is substituted for the molten aluminum in the above Examples, similar results of hazardous compound destruction are obtained.

While the foregoing describes preferred embodiments, modifications within the scope of the invention will be evident to those skilled in the art. Thus, the scope of the invention is intended to be defined by the claims.

What is claimed is:

1. A process for treating hazardous wastes which contain hazardous organic compound containing covalently bound element selected from the group consisting of oxygen, nitrogen, sulfur and phosphorus, said process comprising the steps of introducing such compound below the surface of a bath comprising molten aluminum and reacting covalently bound oxygen, nitrogen, sulfur and phosphorus in said compound with molten aluminum in said bath to reduce such compound thereby destroying it and forming less hazardous product.

2. A process as recited in claim 1, in which the hazardous organic compound contains covalently bound oxygen and is selected from the group consisting of alcohols, aldehydes, ketones, carboxylic acids, esters, and ethers.

3. A process as recited in claim 1, in which the hazardous organic compound contains covalently bound nitrogen and is selected from the group consisting of nitriles and amines.

4. A process as recited in claim 1, in which the hazardous organic compound contains covalently bound sulfur and is selected from the group consisting of sulfides, thiols, thioketones, thiocarbonyls and mercaptans.

5. A process as recited in claim 1, in which the hazardous organic compound contains covalently bound phosphorus and is a phosphine.

6. A process as recited in claim 1, in which the hazardous organic compound contains both covalently bound oxygen and covalently bound nitrogen and is selected from the group consisting of nitro compounds, nitroso compounds, amides, oximes, amino alcohols and amino acids.

7. A process as recited in claim 1, in which the hazardous organic compound contains both covalently bound sulfur and covalently bound oxygen and is selected from the group consisting of sulfonic acids, sulfonates, thiols and sulfones.

8. A process as recited in claim 1, in which the hazardous organic compound contains both covalently bound oxygen and covalently bound phosphorus and is selected from the group consisting of phosphates and phosphonates.

9. A process as recited in claim 1, in which the hazardous organic compound contains covalently bound sulfur and covalently bound nitrogen and is selected from the group consisting of thioamides and amino thiols.

10. A process as recited in claim 1, in which the hazardous organic compound additionally contains halogen.

11. A process as recited in claim 1 in which the hazardous organic compound contains covalently bound oxygen, nitrogen and sulfur.

12. A process as recited in claim 1 in which the hazardous organic compound contains covalently bound oxygen, sulfur and phosphorus.

13. A process as recited in claim 1 in which the hazardous organic compound contains covalently bound nitrogen, phosphorus and oxygen.

14. A process as recited in claim 1 in which the hazardous organic compound contains covalently bound oxygen, nitrogen, phosphorous and sulfur.

* * * * *